Dec. 31, 1940.    W. BLACK    2,226,802
HYDRAULIC COUPLING FOR VEHICLES
Filed June 14, 1939
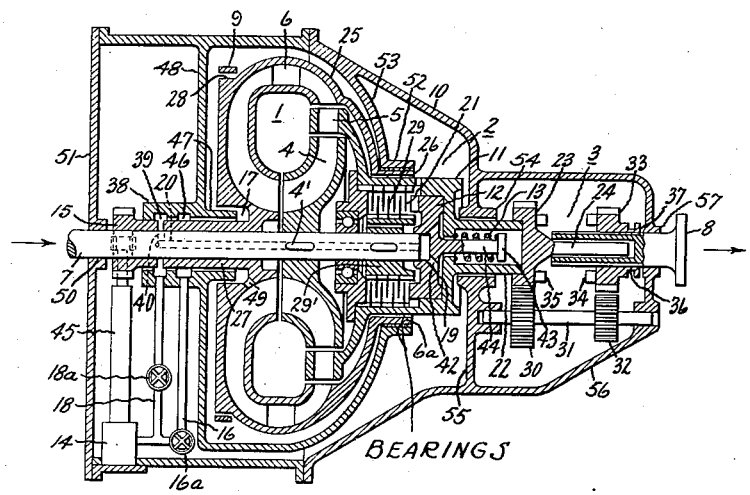
Inventor:
Willy Black,
by Harry E. Dunham
His Attorney.

Patented Dec. 31, 1940

2,226,802

UNITED STATES PATENT OFFICE 2,226,802

HYDRAULIC COUPLING FOR VEHICLES

Willy Black, Berlin-Halensee, Germany, assignor to General Electric Company, a corporation of New York Application June 14, 1939, Serial No. 279,188 In Germany June 14, 1938

2 Claims. (Cl. 192—3.2)

My invention relates to hydraulic gear transmissions for vehicles and more particularly to the Föttinger type of hydraulic gear transmissions used for the driving of automotive vehicles.

One object of my invention is to provide a simplified construction of a hydraulic gear transmission including a clutch and reversing gear to obtain a more compact construction and a corresponding saving of space.

For a better understanding of my invention, together with other and further objects thereof, reference is had to the following description taken in connection with the accompanying drawing, and its scope will be pointed out in the appended claims.

The accompanying drawing illustrates a cross sectional elevation, taken through the center, of a gear transmission built in accordance with my invention. Referring to this drawing in detail, the transmission comprises a hydraulic torque converter 1, a multiple plate clutch 2, and a mechanical reversing gear 3. The hydraulic coupling is of the type described in detail in U. S. Patents 1,199,359 and 1,199,361. It includes an impeller wheel 4, a turbo wheel 5, and a guide wheel 6. The impeller wheel is mounted upon a shaft 7 and rigidly secured to turn therewith by a key 4'. The turbo wheel is provided with a hollow hub 11 which supports one set of coupling plates 21 on its inner surface. The hub 11 is further provided with an extension in the form of an auxiliary hub 22, the end of which is closed by a gear 23. The gear 23 is provided in turn with a pilot shaft 24 which telescopes with the hollow driven shaft 8.

The guide wheel 6 comprises a casing 25 having a hub 26, at one end thereof, surrounding the hub 11 of the turbine wheel. A bearing fit is provided between the hubs 11 and 26, so that the guide wheel is concentric with the hub 11 and the wheels may rotate relatively to each other. The casing 25 is further provided with a hub 27, at its other end, which surrounds the shaft 7, a bearing fit being provided between this hub and shaft 7. The guide wheel, therefore, is mounted for rotation about the shaft 7 and the hub 11. The coupling may be used for torque conversion and also as a mere coupling. During torque conversion operation, which is the equivalent of speed reducing operation, the guide wheel is held stationary. For this purpose, the casing 25 is provided with a braking surface 28 which is engageable by a brake 9. The brake 9 is a band surrounding the surface 28, and is moved in and out of engagement with the brake surface by any suitable means (not shown).

The clutch mechanism 2 includes a set of plates 29 attached to a hub 29' mounted on and keyed to the shaft 7. The plates 29 cooperate with the plates 21 to connect the shaft 7 directly to the turbine wheel 5, and thereby effect a direct mechanical connection between the drive and driven shafts.

The power of the turbine wheel is transmitted to the driven shaft 8 by a direct connection or through the reversing gear train 3. The drawing illustrates the reverse gear in operating position. The gear 23 transmits power to a gear 30 mounted on a shaft 31. A second gear 32 also mounted on the shaft 31 drives a gear 33 through an idling gear (not shown). The gear 33 is splined to and mounted to drive the shaft 8. It may be moved along this shaft by any suitable means. Teeth 34 on the side of the sliding gear 33 are provided to engage gear teeth 35 on the side of the gear 23. The gear 33 is provided with a slot 36 in its hub 37 for engagement by any suitable means (not shown) for moving this gear 33 in and out of engagement with the gear 23.

The clutch 2 is controlled by a piston 12, mounted inside of the hub 11, and operated by oil pressure obtained from a suitable source, such as, for example, a pump 14 mounted in the casing 10 of the transmission. The oil from this pump is fed through a pipe connection 18, a valve 18a, hub 38, annular channel 39 in the hub 38, a hole 40 connecting the annular channel 39 with a bore 20 through the axis of the shaft 7, and a hole 42 opening from the end of shaft 7, through the piston 12, to the chamber 19 between the piston 12 and the end wall of hub 11. Oil reaching this chamber will advance the piston against the pressure of a spring 13. This spring is mounted on a shaft 44 extending from the piston 12 into the hub 22. The spring is compressed between a collar 43 attached to the end of the shaft 44 and the dividing wall between the hub 11 and the auxiliary hub 22. The piston effects an engagement of the two sets of plates 21 and 29, and thereby effects a direct drive between impeller wheel 4 and turbine wheel 5.

The fluid for operating the coupling is also obtained from the pump 14, which is driven through a suitable gearing from the shaft 7. This gearing includes gear 15 mounted on shaft 7, and a suitable gear on a pump shaft 45. Oil is supplied to the chamber of the coupling through valve 16a, pipe 16, annular channel 46 to a clearance space between the hub 27 and an extension 47 of hub 38. The hub 38 is mounted in a wall 48 of the casing 10. The fluid continues into the casing formed by the guide wheel through holes 49 in the guide wheel casing 25. The casing 10 is provided with webs supporting the necessary bearings of the gear transmission. The shaft 7 rides in a bearing 50 in the end wall 51 of the casing. The wall 48 of the casing 10 carries hub 38 for the purpose of guiding fluid from the pump 14 to the bore within the shaft 7 and to the coupling casing 25. A sleeve 52 in the wall 53 carries an assembly of two bearings and the clutch mechanism within the axial length of a single bearing. This assembly includes the hub 26 of the guide wheel 6. This hub has an outer bearing surface which engages the bearing 52 and has an inner bearing surface that rotates on the hub 11 of the turbine wheel. By means of this compact structure considerable saving is effected in the length of the transmission. A sleeve 54 is supported within the wall 55 of the casing 10 and guides the extension 22 of the turbine hub into the reversing gear casing 56. The casing 56 encloses the clutch and reversing gears for the shaft 8, which projects through a sleeve 57 in the end wall of this casing. The weight of the rotating parts is therefore distributed over the sleeves 50, 52, 54 and 57.

In operation fluid pressure is obtained from the pump 14 as soon as shaft 7 is driven. Oil is admitted to the coupling by opening the valve 18a oil flowing through pipe 16, sleeve 47 and ports 49 into the blades of the guide wheel 6. Sufficient oil is admitted to reach the blades of the pump wheel 4 which then sets this oil into motion to transmit power to the turbine wheel 5. The valve 18a is opened to secure an operation of the clutch piston 12. In the position shown, shaft 8 is driven in reverse direction and for forward operation the gear 33 is moved forward along the shaft 8 until the clutch teeth 34 and 35 engage and provide a direct drive between shaft 8 and the hub 11.

What I claim as new and desire to secure by Letters Patent of the United States is:

1. In a gear transmission, the combination of a casing, a hydraulic coupling provided with an impeller wheel, a turbine wheel provided with a hollow hub, and a guide wheel, a clutch mechanism for connecting said impeller wheel to said turbine wheel mounted in said hub, and bearing means for supporting said guide wheel and said turbine wheel mounted about one another on said hub.

2. In a hydraulic gear transmission for automotive vehicles, the combination of a casing, a drive shaft, an impeller wheel mounted on said drive shaft, a turbine wheel and a guide wheel, a clutch mechanism for connecting said drive shaft and said turbine wheel mounted in the hub of said turbine wheel cooperating bearing surfaces for supporting said guide wheel and said turbine wheel mounted about one another on said hub, and means for supplying operating fluid for said clutch through said drive shaft.

WILLY BLACK.